United States Patent
Jung et al.

(10) Patent No.: US 11,403,731 B2
(45) Date of Patent: Aug. 2, 2022

(54) IMAGE UPSCALING APPARATUS USING ARTIFICIAL NEURAL NETWORK HAVING MULTIPLE DECONVOLUTION LAYERS AND DECONVOLUTION LAYER PLURALIZATION METHOD THEREOF

(71) Applicant: INDUSTRY-ACADEMIC COOPERATION FOUNDATION, YONSEI UNIVERSITY, Seoul (KR)

(72) Inventors: Seong Ook Jung, Seoul (KR); Sung Hwan Joo, Seoul (KR); Su Min Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 199 days.

(21) Appl. No.: 17/029,478

(22) Filed: Sep. 23, 2020

(65) Prior Publication Data
US 2021/0342973 A1 Nov. 4, 2021

(30) Foreign Application Priority Data
Apr. 29, 2020 (KR) .................. 10-2020-0052078

(51) Int. Cl.
G06T 3/40 (2006.01)
G06T 5/20 (2006.01)
G06N 3/08 (2006.01)

(52) U.S. Cl.
CPC .......... *G06T 3/4046* (2013.01); *G06N 3/08* (2013.01); *G06T 3/4053* (2013.01); *G06T 5/20* (2013.01);
(Continued)

(58) Field of Classification Search
None
See application file for complete search history.

(56) References Cited

U.S. PATENT DOCUMENTS

2012/0303932 A1* 11/2012 Farabet .................. G06N 3/10
712/30
2021/0224630 A1* 7/2021 Sudhir .................... G06F 7/57

FOREIGN PATENT DOCUMENTS

CN 109992743 A * 7/2019 ............ G06F 17/16
CN 113592075 A * 11/2021
(Continued)

OTHER PUBLICATIONS

Xu Yang et al., Shuffle-Then-Assemble: Learning Object-Agnostic Visual Relationship Features, arXiv: 1808.00171v1, 1-17pages (Aug. 1, 2018).

*Primary Examiner* — Jiangeng Sun (57) ABSTRACT

Disclosed is an image upscaling apparatus that includes: multiple convolution layers, each configured to receive an input image or a feature map outputted by a previous convolution layer and extract features to output a feature map; and a multilayer configured to receive a final feature map outputted from the last convolution layer and output an upscaled output image. The multilayer includes: a first partition layer including first filters having a minimum size along the x-axis and y-axis directions and the same size as the final feature map along the z-axis direction; and at least one second partition layer, each including second filters, having a size greater than that of the first filter in the x-axis and y-axis directions and having a number and size of the first filter in the z-axis direction, and configured to shuffle features in the x-axis and y-axis directions of the first shuffle map.

18 Claims, 8 Drawing Sheets

(52) U.S. Cl.
CPC ............... *G06T 2207/20016* (2013.01); *G06T 2207/20081* (2013.01); *G06T 2207/20084* (2013.01)

(56) References Cited

FOREIGN PATENT DOCUMENTS

| KR | 1020180105556 A | 9/2018 |
| KR | 10-2019-0087264 A | 7/2019 |

* cited by examiner

IMAGE UPSCALING APPARATUS USING ARTIFICIAL NEURAL NETWORK HAVING MULTIPLE DECONVOLUTION LAYERS AND DECONVOLUTION LAYER PLURALIZATION METHOD THEREOF

CROSS-REFERENCE TO RELATED APPLICATIONS

This application claims priority under 35 U.S.C. § 119 from Korean Patent Application No. 10-2020-0052078, filed with the Korean Intellectual Property Office on Apr. 29, 2020, the disclosure of which is incorporated herein by reference in its entirety.

BACKGROUND

1. Technical Field

The present disclosure relates to an image upscaling apparatus and a deconvolution layer pluralization method thereof, more particularly to an image upscaling apparatus that uses an artificial neural network having multiple deconvolution layers and a deconvolution layer pluralization method thereof.

2. Description of the Related Art

As users increasingly show interest in high-resolution images, there is a growing demand for UHD (ultra-high definition) broadcasting. To achieve this, however, there are currently several difficulties that must be overcome, such as limits in communication bandwidth and a shortage of UHD image contents. Therefore, much attention is being focused on image upscaling technology, which involves transmitting FHD (full high definition) images, which satisfy current communication bandwidth conditions and of which numerous image contents are available, and then converting the FHD images to UHD images of higher resolutions at the user terminal.

While various algorithms have been proposed as image upscaling technology, the super resolution technique, which entails a computation method that applies an artificial intelligence algorithm using an artificial neural network, is known to provide a higher performance compared to algorithms based on simple calculation operations.

With the super resolution technique, especially good performance is obtained when applying a CNN (convolutional neural network), which is based on convolution operations, and among the many algorithms based on the CNN, the FSRCNN (fast super-resolution convolutional neural network) is generally adopted. However, when using a FSRCNN to upscale FHD images to UHD images, the amount of computation may be extremely large, so that it is difficult to implement at the user terminal level and not at the level of a higher-performance server.

Thus, FSRCNN_s (i.e. a smaller model size version of FSRCNN) has been proposed, which uses relatively fewer parameters compared to the FSRCNN. However, using the FSRCNN_s still requires a large amount of computation, so that the hardware chip for performing image upscaling in a user terminal requires a large chip size due to the large-scale computation needed and incurs a very high manufacturing cost.

SUMMARY

An aspect of the disclosure is to provide an image upscaling apparatus and a deconvolution layer pluralization method thereof in which a single deconvolution layer for image upscaling is formed as multiple layers to suppress degradations in picture quality and greatly reduce the amount of computation.

Another aspect of the disclosure is to provide an image upscaling apparatus and a deconvolution layer pluralization method thereof in which the number of required calculators can be reduced, so that the apparatus can be implemented by hardware of a smaller size and lower cost.

Yet another aspect of the disclosure is to provide an image upscaling apparatus and a deconvolution layer pluralization method thereof in which the difference in the amount of computation processed by each layer can be reduced, so that a pipeline technique may be readily applied to improve operating speed.

An embodiment of the disclosure, conceived to achieve the objectives above, provides an image upscaling apparatus that includes: a multiple number of convolution layers, each of which is configured to receive an input image or a feature map outputted by a previous convolution layer and output a feature map by extracting features from the input image or from the previous feature map; and a multilayer, which is configured to receive a final feature map outputted from the last convolution layer among the multiple convolution layers and output an output image upscaled to have a predefined resolution higher than the resolution of the input image.

The multilayer may include: a first partition layer including a multiple number of first filter having a minimum size along the x-axis and y-axis directions and having the same size as the z-axis direction size of the final feature map along the z-axis direction, where the x-axis, y-axis, and z-axis directions represent the width, height, and depth directions of the final feature map; and at least one second partition layer, each of which may include a multiple number of second filters having a size greater than that of the first filter in the x-axis and y-axis directions and having a size of the first filter in the z-axis direction, and may be configured to shuffle features in the x-axis and y-axis directions of the first shuffle map.

The first partition layer can output the first shuffle map by having the multiple first filters perform MAC (multiply-accumulate) operations while moving in units of elements along the x-axis and y-axis directions in the final feature map and arranging computed values obtained as the results of the MAC operations at positions corresponding to the x-axis and y-axis positions of the operand elements but with the computed values arranged at different predefined positions along the z-axis direction in correspondence with the multiple first filters, respectively.

The number of first filters included in the first partition layer can correspond to the ratio of increase in resolution between the input image and the output image.

The at least one second partition layer can output a second shuffle map by having the multiple second filters perform MAC operations while moving in units of elements along the x-axis and y-axis directions in the first shuffle map or a second shuffle map received from a previous second partition layer and can arrange the computed values obtained as the results of the MAC operations at positions corresponding to the x-axis and y-axis positions of the operand elements of the received first shuffle map or second shuffle map but with the computed values arranged at different predefined positions along the z-axis direction in correspondence with the multiple second filters, respectively.

The number of second partition layers and the size of the second filters can be set such that the total number of computations required of the multilayer which includes the first partition layer and the at least one second partition layer does not exceed a predefined threshold.

Each of the multiple convolution layers can include at least one convolution filter, which has a predefined size and in which weights obtained by learning are mapped, where the convolution layer can receive the input image or a feature map outputted from a previous convolution layer, and the convolution filter can extract features from the received input image or feature map to output a feature map.

The final feature map can have an x-axis direction size and a y-axis direction size corresponding to the resolution of the input image and a z-axis direction size corresponding to the number of convolution filters included in the last convolution layer among the multiple convolution layers.

The multilayer can further include a remapping layer configured to expand and rearrange elements arranged in the z-axis direction in a second shuffle map, which may be outputted from the last second partition layer among the at least one second partition layers, such that the rearranged elements are placed adjacent to each other in a 2-dimensional plane according to a predefined pattern and arrangement order.

Another embodiment of the disclosure, conceived to achieve the objectives above, provides a deconvolution layer pluralization method for an image upscaling apparatus that includes: setting a multiple number of convolution layers, which may be configured to receive an input image or a feature map outputted by a previous convolution layer and output a feature map by extracting features from the input image or from the previous feature map; and setting a multilayer as a deconvolution layer configured to receive a final feature map outputted from the last convolution layer among the multiple convolution layers and output an output image upscaled to have a predefined resolution higher than a resolution of the input image, wherein the setting of the multilayer may include: setting a first partition layer, which may be configured to output a first shuffle map and may include a multiple number of first filters that have a minimum size along the x-axis and y-axis directions and have the same size as the z-axis direction size of the final feature map along the z-axis direction when the x-axis, y-axis, and z-axis directions represent the width, height, and depth directions of the final feature map; and setting at least one second partition layer, which may each be configured to shuffle features in the x-axis and y-axis directions of the first shuffle map and may include a multiple number of second filters that have a size greater than that of the first filter in the x-axis and y-axis directions and have a size of the first filter in the z-axis direction.

An image upscaling apparatus and a deconvolution layer pluralization method thereof according to an embodiment of the disclosure can suppress degradations in picture quality while greatly reducing the amount of computation by forming the deconvolution layer as multiple layers. Thus, when implementing the apparatus as hardware, the number of calculators can be reduced, allowing manufacture in a smaller size and a lower cost. Also, as the difference in the amount of computation required at each layer is reduced, it is possible to readily apply a pipeline technique to significantly improve operating speed.

Additional aspects and advantages of the present disclosure will be set forth in part in the description which follows, and in part will be obvious from the description, or may be learned by practice of the disclosure.

DETAILED DESCRIPTION

To sufficiently understand the present invention, its advantages, and the objectives achieved by practice of the invention, it is necessary to refer to the appended drawings which illustrate preferred embodiments of the disclosure as well as the descriptions provided for the appended drawings.

The present disclosure is described in detail below, through a description of preferred embodiments of the disclosure with reference to the accompanying drawings. However, the disclosure can be implemented in various different forms and is not limited to the described embodiments. For a clearer understanding of the disclosure, parts that are not of great relevance to the disclosure have been omitted, and like reference numerals in the drawings are used to represent like elements.

Throughout the specification, reference to a part "including", 'having', or "comprising" an element does not preclude the existence of one or more other elements and can mean other elements are further included, unless there is specific mention to the contrary. Also, terms such as "part", "device", "module", "block", etc., refer to units for processing at least one function or operation, where such units can be implemented as hardware, software, or a combination of hardware and software.

Figure 1:
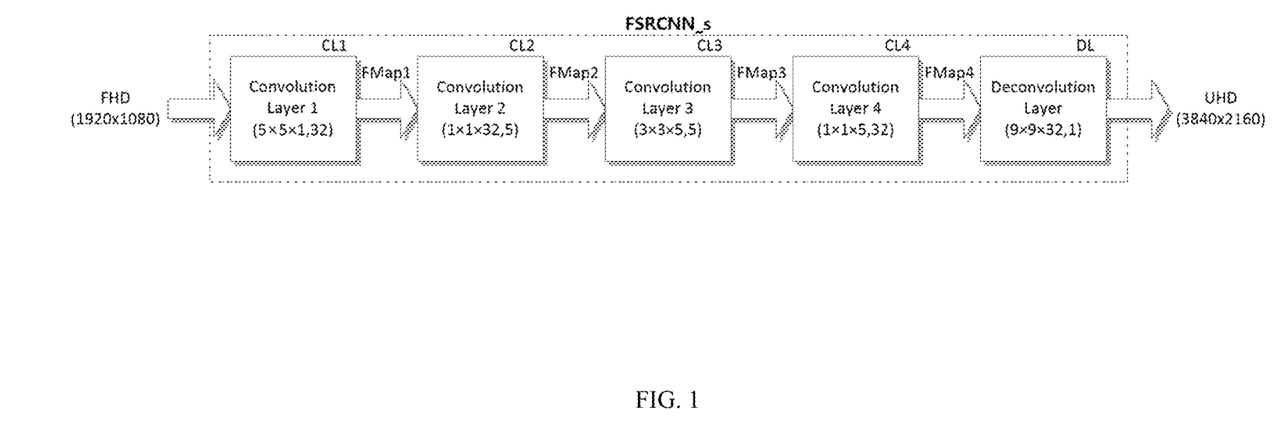
FIG. 1 schematically illustrates the composition of an image upscaling apparatus using a FSRCNN_s.
Figure 2:
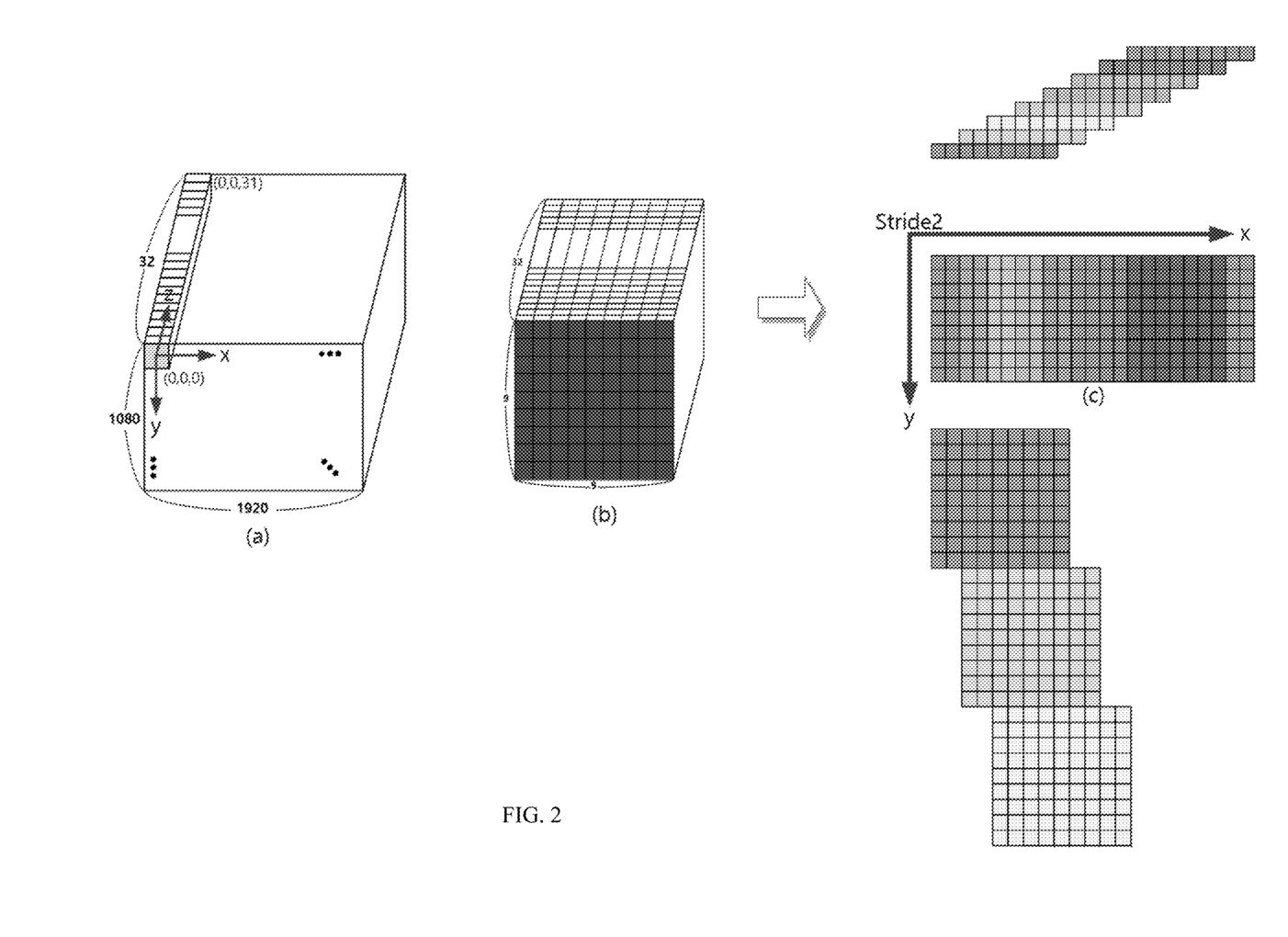
FIG. 2 illustrates a deconvolution computation method of the deconvolution layer in the FSRCNN_s of FIG. 1.

FIG. 1 schematically illustrates the composition of an image upscaling apparatus using a FSRCNN_s, and FIG. 2 illustrates a deconvolution computation method of the deconvolution layer in the FSRCNN_s of FIG. 1.

Referring to FIG. 1, a FSRCNN_s may include four convolution layers CL1~CL4 and one deconvolution layer DL. Each of the four convolution layers CL1~CL4 may include at least one filter (also referred to as a kernel) of a predefined size. Here, each of the at least one filter may be structured such that a multiple number of weights obtained through learning are arranged in correspondence to the filter size.

Representing the size as width×height×depth, from among the four convolution layers CL1~CL4 in the FSRCNN_s, a first convolution layer CL1 may include one filter having a 5×5×1 size (5×5×1, 32), a second convolution layer CL2 may include five filters of a 1×1×32 size (1×1×32, 5), and a third convolution layer CL3 may include five filters of a 3×3×5 size (3×3×5, 5). Lastly, a fourth convolution layer CL4 may include thirty two filters of a 1×1×5 size (1×1×5, 32).

Among the four convolution layers CL1~CL4, the first convolution layer CL1 may receive an input image and may use the included filter to extract features from the received input image to obtain a first feature map FMap1.

The second to fourth convolution layers CL2~CL4 may receive the first to third feature maps FMap1~FMap3 outputted from the previous convolution layers CL1~CL3 respectively and may extract features from the received first to third feature maps FMap1~FMap3 to obtain second to fourth feature maps FMap2~FMap4.

Here, a reason for the FSRCNN_s including multiple convolution layers CL1~CL4 and extracting features to provide feature maps hierarchically is so that higher-level features may be extracted compared to the case of extracting features from the input image.

Similarly to the four convolution layers CL1~CL4, the deconvolution layer DL may also include one filter of a 9×9×32 size (9×9×32, 1). The filter of the deconvolution layer DL may also be structured such that multiple weights obtained through learning are arranged in correspondence to the filter size. However, the deconvolution layer DL may perform computations by applying the one filter (9×9×32, 1) in a manner different from that of the filters of the four convolution layers CL1~CL4 to thereby output an output image having a resolution higher than the resolution of the input image.

When the fourth feature map FMap4, which is the final feature map, is outputted from the fourth convolution layer CL4, which is positioned last among the four convolution layers CL1~CL4, the deconvolution layer DL may receive the fourth feature map FMap4, apply the filter at the element level to the received fourth feature map FMap4, arrange the values to which the filter has been applied in predefined intervals, and add the element values of the corresponding positions to obtain the output image having a resolution higher than that of the input image.

Suppose, as an example, that the input image is an FHD image having a resolution of 1920×1080 and the output image is a UHD image having a resolution of 3840×2160.

In this case, as illustrated in part (a) of FIG. 2, the fourth feature map FMap4, which is the final feature map, may be outputted in a size of 1920×1080×32. For convenience, the width-direction position, height-direction position, and depth-direction position of each element forming the fourth feature map FMap4 will hereinafter be expressed as x-axis, y-axis, and z-axis coordinates such as in part (a) of FIG. 2.

As illustrated in part (b) of FIG. 2, the filter of the deconvolution layer DL having a size of 9×9×32 may perform a MAC (multiply-accumulate) operation while moving in units of elements (stride1) along the x-axis and y-axis directions in the fourth feature map FMap4 of size 1920×1080×32.

The deconvolution layer DL may multiply each of the 1920×1080 number of 1×1×32 size z-axis direction vectors with the 9×9×32 size filter in the fourth feature map FMap4 to obtain a 1920×1080 number of 9×9×1 size matrices, as illustrated at the bottom of part (c) in FIG. 2. Then, for the 1920×1080 number of 9×9×1 size matrices thus obtained, the deconvolution layer DL may move in units of two elements (stride2) along the x-axis and y-axis directions in correspondence with the x-axis and y-axis position of the operand element and add the values of the elements at the corresponding position, to output a UHD image having a 3840×2160 resolution in which the sizes in the directions of the x axis and y axis, i.e. the width and height, have each been expanded by twice as much. Although part (c) of FIG. 2 illustrates adding the obtained matrices while moving in units of two elements (stride2) along the direction of the x axis only due to spatial constraints, the obtained matrices would be added in the same manner in the direction of the y axis as well.

Thus, the FSRCNN_s can be used as an upscaling apparatus that receives an FHD image having a resolution of 1920×1080 as the input image, extracts features to generate a feature map, and performs a deconvolution operation on the generated feature map to increase the resolution in the x-axis and y-axis directions twofold and output a UHD image having a resolution of 3840×2160 as the output image.

However, in the FSRCNN_s, whereas the four convolution layers CL1~CL4 are for extracting high-level features from the input image and do not undergo large amounts of computation, the deconvolution layer DL for outputting an upscaled image from the extracted feature map requires a relatively much large amount of computation. The FSRCNN_s requires less computation compared to the FSRCNN, but even so, upscaling an FHD image to a UHD image would require performing multiplication operations 2,592 times and addition operations 2,560 times, and these account for 65.83% of the overall amount of computation required in the FSRCNN_s. In other words, a considerable amount of the computation performed by the FSRCNN_s is performed at the deconvolution layer DL, and this amounts to more than twice the amount of computation performed at the remaining four convolution layers CL1~CL4.

When implementing such image upscaling apparatus based on the FSRCNN_s as hardware, the amount of computation that has to be performed by the deconvolution layer DL is very large and a large amount of calculators may be required. This not only poses difficulties in fabricating a device in a small size and with a low cost but also leads to high power consumption.

Since a video clip typically transmits images at a rate of 60 frames per second, image upscaling must be performed within an extremely short time of 0.0166 s per frame. Also, when upscaling an FHD image to a UHD image, the total amount of computation required of the FSRCNN_s for each frame is 16.1 GOP. Therefore, an image upscaling apparatus may have to be implemented such that it is capable of processing computations of 966 GOP per second (16.1 GOP/0.0166 s), which is beyond what can be realistically implemented on a user terminal.

Moreover, the differences in the amounts of computation between the deconvolution layer DL and the convolution layers CL1~CL4 may incur a bottleneck effect, making it difficult to apply the pipeline technique, etc., for supporting high-speed operation. That is, the differences in amounts of computation pose an obstacle in implementing a high-performance image upscaling apparatus.

Figure 3:
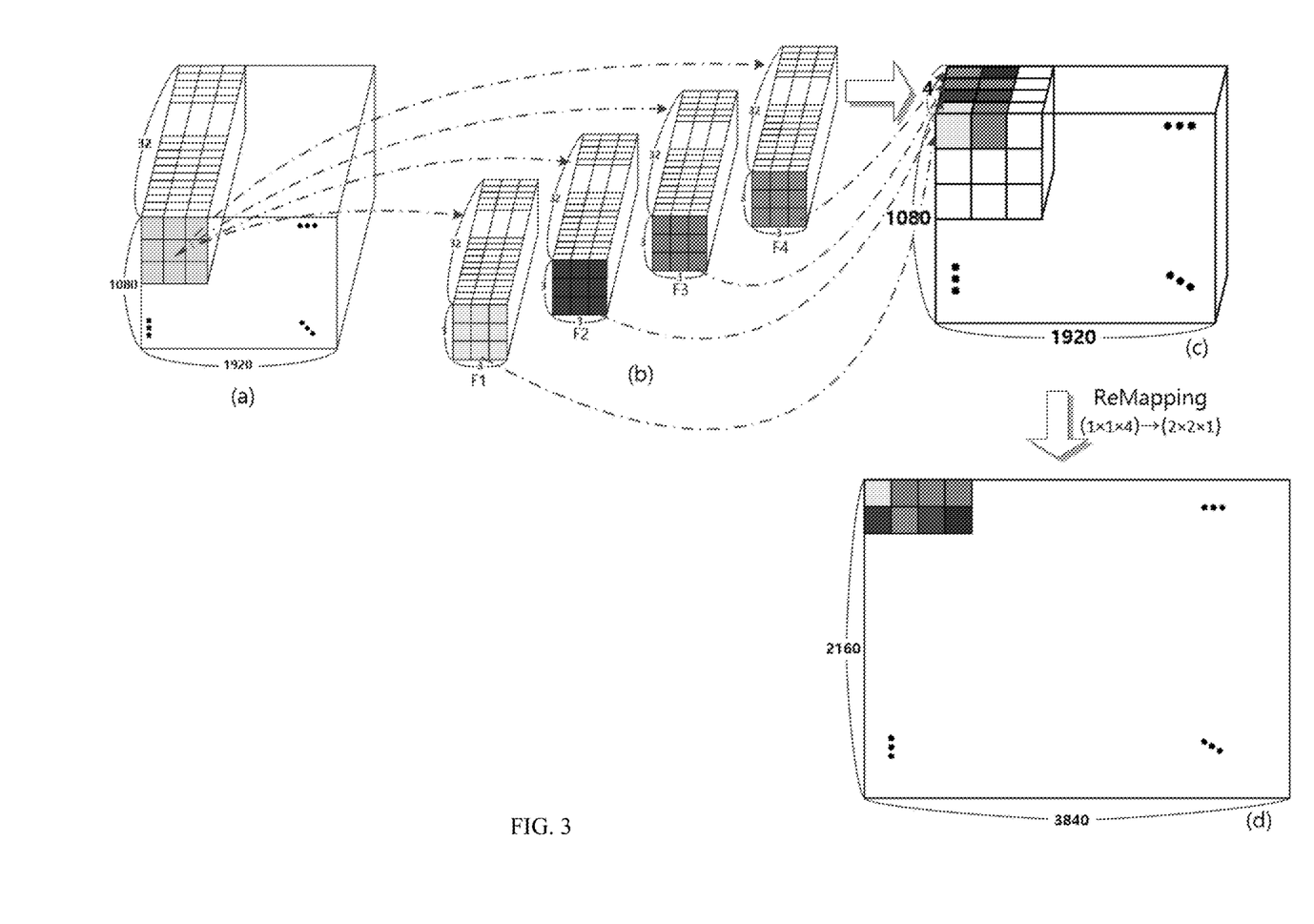
FIG. 3 illustrates the operation of a shuffling layer, which can replace the deconvolution layer of a FSRCNN_s.

FIG. 3 illustrates the operation of a shuffling layer, which can replace the deconvolution layer of a FSRCNN_s.

FIG. 3 illustrates the operation of a shuffling layer, which has been conceived to reduce the amount of computations involved in the deconvolution operation performed at the deconvolution layer DL in the FSRCNN_s illustrated in FIG. 2. Whereas the deconvolution layer DL is composed as a single filter having a size of 9×9×32 as illustrated in part (b) of FIG. 2, the shuffling layer can be composed of four filters F1~F4 each having a size of 3×3×32. Here also, multiple weights obtained through learning can be mapped and stored in each of the four filters F1~F4.

Each of the four filters F1~F4 of the shuffling layer may move in units of elements in the x-axis and y-axis directions in the final feature map, i.e. the fourth feature map FMap4, and perform a MAC operation on the region of the corresponding size (3×3×32). Here, the four filters F1~F4 may perform the operations for the same region. The computed values obtained as a result of the operations may be arranged at the positions corresponding to the x-axis and y-axis positions of the operand elements but may be arranged at different positions along the z-axis direction in correspondence with the respective four filters F1~F4. Thus, as illustrated in part (c) of FIG. 3, the MAC operation results by the four filters F1~F4 can be obtained in the form of a shuffle map having a size of 1920×1080×4. The shuffling layer may perform a remapping procedure of expanding and rearranging the positions of the four elements (1×1×4) along the z-axis direction in the 1920×1080×4 sized shuffle map, i.e. the elements of the 1920×1080 number of z vectors, according to a predefined pattern and arrangement order (2×2×1) in a 2-dimensional plane.

As the four elements along the z-axis direction in the shuffle map are expanded and remapped, the shuffling layer can output a UHD image having a resolution of 3840×2160 as the output image. That is, just as achieved by the deconvolution layer illustrated in FIG. 2, a UHD image upscaled from the fourth feature map FMap4 can be outputted.

Here, in the shuffling layer that performs the MAC operations using the four filters F1~F4 of size 3×3×32, the upscaling of an FHD image to a UHD image involves performing a multiplication computation 1,152 times and an addition computation 1,120 times. This can be regarded as a drastic reduction in computation compared to the deconvolution layer DL, which requires performing a multiplication computation 2,592 times and an addition computation 2,560 times. In spite of this, the amount of computation required by the shuffling layer is much larger relative to the amount of computation performed by the remaining four convolution layers CL1~CL4 and corresponds to 46.13% of the total amount of computation of the FSRCNN_s.

Table 1 and Table 2 each show the sizes and numbers of filters in each layer as well as the numbers of multiplication and addition operations performed when a shuffling layer is used to replace the deconvolution layer, for the cases of a FSRCNN and a FSRCNN_s, respectively.

TABLE 1

| FSRCNN | CL1 | CL2 | CL3 | CL4 | CL5 | CL6 | CL7 | DL | Shuff. 3 × 3 |
|---|---|---|---|---|---|---|---|---|---|
| Filter Size | 5 × 5 | 1 × 1 | 3 × 3 | 3 × 3 | 3 × 3 | 3 × 3 | 1 × 1 | 9 × 9 | 3 × 3 |
| Filter Depth | 1 | 56 | 12 | 12 | 12 | 12 | 12 | 56 | 56 |
| # of Filter | 56 | 12 | 12 | 12 | 12 | 12 | 56 | 1 | 4 |
| # of Mul. | 1400 | 672 | 1296 | 1296 | 1296 | 1296 | 672 | 4536 | 2016 |
| # of Add. | 1344 | 660 | 1284 | 1284 | 1284 | 1284 | 616 | 4480 | 1960 |

TABLE 2

| FSRCNN_s | CL1 | CL2 | CL3 | CL4 | DL | Shuff. 3 × 3 |
|---|---|---|---|---|---|---|
| Filter Size | 5 × 5 | 1 × 1 | 3 × 3 | 1 × 1 | 9 × 9 | 3 × 3 |
| Filter Depth | 1 | 32 | 5 | 5 | 32 | 32 |
| # of Filter | 32 | 5 | 5 | 32 | 1 | 4 |
| # of Mul. | 800 | 160 | 225 | 160 | 2592 | 1152 |
| # of Add. | 768 | 155 | 220 | 128 | 2560 | 1120 |

As shown in Table 1 and Table 2, even though the FSRCNN_s has reductions in parameters, such as the number of layers and the sizes and numbers of filters included in each layer, and hence a great reduction in the amount of computation is still required. In particular, it can be seen that the amount of computation required at the deconvolution layer DL is significantly greater than the amount of computation required at the remaining convolution layers CL1~CL4. Also, from Table 1 and Table 2, it can be seen that, in both the FSRCNN_s and the FSRCNN, replacing the deconvolution layer DL with the shuffling layer illustrated in part (b) of FIG. 3 can reduce the amount of computation by about ½. In spite of this, the amount of computation of the shuffling layer is relatively very large compared to the amount of computation required by the remaining convolution layers CL1~CL4.

Thus, even if the deconvolution layer DL is replaced with a single shuffling layer, a large number of calculators are still needed, making it difficult to implement an image upscaling apparatus with hardware and apply a pipeline technique, etc.

While FIGS. 1 to 3 supposes the image upscaling apparatus as being based on the FSRCNN_s and thus describes the image upscaling apparatus as including four convolution layers CL1~CL4, the number of convolution layers and the sizes and numbers of filters included in each convolution layer can be varied. Also, the size of the filter included in the deconvolution layer DL and shuffling layer can be varied as well.

Figure 4:
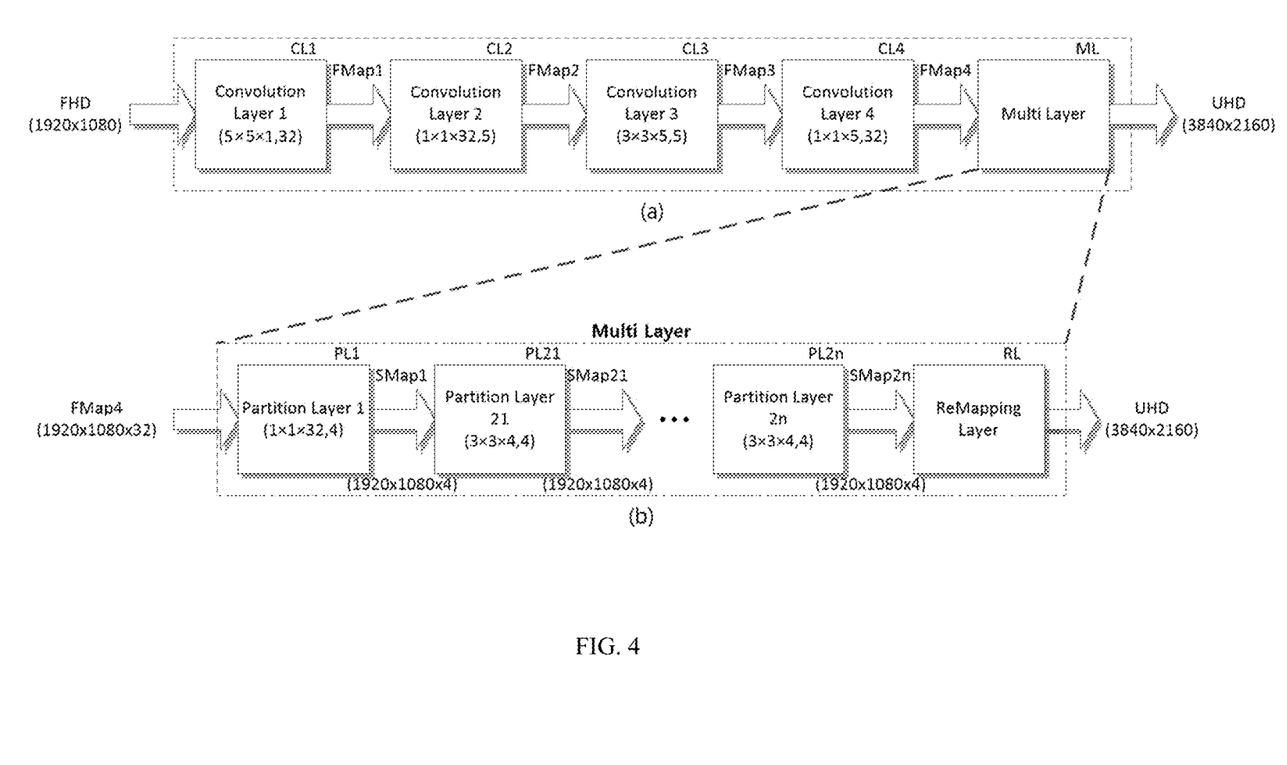
FIG. 4 schematically illustrates the composition of an image upscaling apparatus having multiple deconvolution layers according to an embodiment of the disclosure.
Figure 5:
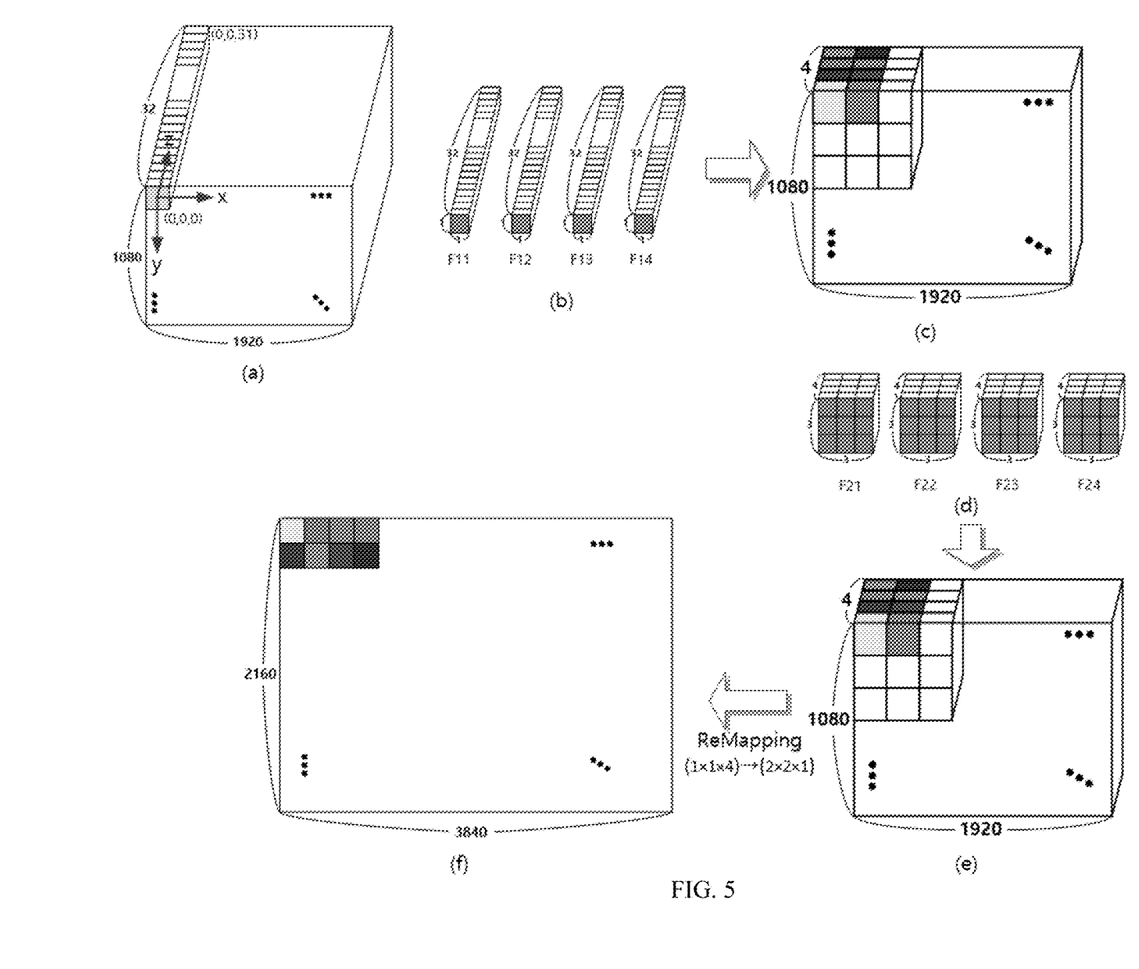
FIG. 5 illustrates the operation of the multilayer of FIG. 4.

FIG. 4 schematically illustrates the composition of an image upscaling apparatus having multiple deconvolution layers according to an embodiment of the disclosure, and FIG. 5 illustrates the operation of the multilayer of FIG. 4.

Referring to part (a) of FIG. 4, it is supposed in this embodiment that the image upscaling apparatus is formed based on the FSRCNN_s and includes four convolution layers CL1~CL4, similar to the image upscaling apparatus of FIG. 1. Therefore, since the four convolution layers CL1~CL4 are substantially the same as the convolution layers CL1~CL4 of FIG. 1, these are not described here in detail. However, the image upscaling apparatus in FIG. 4 includes a multilayer ML, which consists of a multiple number of layers, in lieu of the deconvolution layer DL in FIG. 1.

Similarly to the deconvolution layer DL of FIG. 1, the multilayer ML may receive the final feature map FMap4 outputted from the convolution layer (in this case, CL4) arranged lastly among the multiple number of convolution layers CL1~CL4 and may obtain and output an output image having an upscaled resolution from the final feature map FMap4. In FIG. 4 also, it is assumed that the input image is an FHD image having a resolution of 1920×1080 and that the upscaled output image is a UHD image having a resolution of 3840×2160.

Part (b) of FIG. 4 illustrates a detailed composition of the multilayer ML. Referring to part (b) of FIG. 4, the multilayer ML may include a multiple number of partition layers PL1, PL21~PL2n and a remapping layer RL. Each of the multiple partition layers PL1, PL21~PL2n can include a multiple number of filters of predefined sizes, similarly to the shuffling layer illustrated in part (b) of FIG. 3. Here, if the resolution is to be upscaled twofold along the x-axis direction and the y-axis direction, the multiple partition layers PL1, PL21~PL2n can each include four filters, as illustrated in parts (b) and (d) of FIG. 5.

A reason why the shuffling layer includes four filters F1~F4 in FIG. 3 and remaps the four elements (1×1×4) in the z-axis direction to a 2-dimensional arrangement position (2×2×1) during the remapping procedure is so that the input image may be upscaled by twice as much in both the x-axis direction and the y-axis direction. Likewise, as it is assumed in FIG. 4 as well that the image upscaling apparatus is to upscale an FHD image to a UHD image, the multiple partition layers PL1, PL21~PL2n can each include four (=$2^2$) filters. However, if the image upscaling apparatus is intended to upscale an input image by k times as much in the x-axis and y-axis directions, then the multiple partition layers PL1, PL21~PL2n can each include a $k^2$ number of filters. However, since degradations in picture quality would occur in proportion to how much the upscale ratio is increased in image upscaling, it is typical to provide upscaling of twice as much in the x-axis and y-axis directions. Thus, the descriptions here will assume that the multiple partition layers PL1, PL21~PL2n each include four filters.

The first partition layer PL1, from among the multiple number of partition layers PL1, PL21~PL2n, may have first filters F11~F14 each of which may be set to a minimum size while having a depth corresponding to the depth of the final feature map FMap4. As illustrated in part (a) of FIG. 5, when the final feature map FMap4 of a 1920×1080×32 size is outputted from the last convolution layer CL4 among the multiple convolution layers CL1~CL4, each of the first filters F11~F14 of the first partition layer PL1 may have a size of 1×1×32, as illustrated in part (b) of FIG. 5.

Due to the properties of the convolution operations performed at the convolution layers CL1~CL4, the depth of the final feature map FMap4 would be the same as the number of filters included in the last convolution layer CL4, and thus, the size of the first filters F11~F14 of the first partition layer PL1 can be determined according to the number of filters in the last convolution layer CL4.

The sizes of second filters, which may be included in the at least one second partition layers PL21~PL2n other than the first partition layer PL1, can be set to any of a variety of sizes that are greater than the size of the first filters included in the first partition layer PL1. For example, the at least one second partition layers PL21~PL2n can include four second filters F21~F24 having a size of 3×3×4, as illustrated in part (d) of FIG. 5, or a size of 5×5×4.

Here, as the size of the first filters F11~F14 of the first partition layer PL1 are set to a minimum size while having a depth corresponding to the depth of the final feature map FMap4, the features arranged along the z-axis direction of the final feature map FMap4 may be shuffled according to the methods learned respectively by the first filters F11~F14 of the first partition layer PL1 to reduce size, and the amount of computation performed at the multilayer ML may be minimized. Also, as the multilayer ML further includes at least one second partition layer PL21~PL2n equipped with second filters F21~F24 each having a size greater than that of the first filters F11~F14, the features of elements that are adjacent in the x-axis direction and y-axis direction can be incorporated, so as to compensate for degradations in picture quality of the output image.

This can compensate for the first filters F11~F14 of the first partition layer PL1 being unable to consider the features of elements adjacent in the x-axis and y-axis directions because these are set to minimum sizes and a depth corresponding to the depth of the final feature map FMap4 and are thus able only to shuffle features arranged in the z-axis direction.

In the case of the shuffling layer in FIG. 3, the multiple filters F1~F4 each have a size of 3×3×32, so that processing the final feature map FMap4 which has a size of 1920×1080×32 requires a large amount of computation. However, with the multilayer ML of FIG. 4, as the first partition layer PL1 has a size of 1×1×32, i.e. a minimum size while having a depth corresponding to the depth of the final feature map FMap4, it would perform computations amounting to ⅑ that of the shuffling layer of FIG. 3, and the amount of computation can be greatly reduced.

As illustrated in part (c) of FIG. 5, the first shuffle map SMap1 outputted from the first partition layer PL1 may be given a size of 1920×1080×4, which is ⅛ the size of the final feature map FMap4. Also, the at least one second partition layers PL21~PL2n may receive the first to (n−1)-th shuffle maps SMap1~SMapn-1 that are outputted in a size of 1920×1080×4 from the previous partition layer PL1, PL21~PL2n-1, respectively, and perform operations on the received shuffle maps. Here, the size of the shuffle maps SMap2~SMapn outputted from the at least one second partition layers PL21~PL2n may remain unchanged at 1920×1080×4.

Therefore, even if the multilayer ML includes many partition layers PL1, PL21~PL2n-1, the overall amount of computation can be further reduced according to the number n of the at least one second partition layers PL21~PL2n and the size of the filters of the second partition layers PL21~PL2n, compared to the case of including a single shuffling layer.

However, setting the first filters F11~F14 of the first partition layer PL1 to a minimum size but with a depth corresponding to the depth of the final feature map FMap4 can reduce the amount of computation but, as described above, cannot properly incorporate the features extracted from the final feature map FMap4 into the upscaled output image. Thus, in the shuffling layer of FIG. 3, the multiple filters F1~F4 could not be set to the minimum size of 1×1×32 as in the case of the first partition layer PL1, even though various sizes could be considered.

In contrast, in the multilayer ML of FIG. 4, the first shuffle map SMap1 outputted from the first partition layer PL1 can subsequently be processed by the at least one partition layers PL21~PL2n that are composed of filters having a size greater than the size of the filter included in the first partition layer PL1, so that the features extracted from the final feature map FMap4 may be evenly incorporated throughout the upscaled output image, and the degradation in picture quality of the output image can be compensated.

Then, for the final shuffle map SMapn outputted from the last partition layer PL2n among the multiple partition layers PL1, PL21~PL2n, the remapping layer RL may perform a remapping procedure of expanding the four elements in the z-axis direction (1×1×4) and rearranging 2-dimensionally in a predefined order, as illustrated in part (f). Although the remapping layer RL is illustrated here as a separate layer for convenience, the remapping procedure in an actual image upscaling apparatus may involve simply altering the reading order of the element values of the final shuffle map SMapn stored in the memory or register and does not necessarily require separate computations, so that the remapping layer RL may not necessarily be implemented in a physical form.

In the multilayer ML described above, the number of second partition layers PL21~PL2n and the filter sizes can be determined beforehand experimentally based on the peak signal-to-noise ratio (hereinafter referred to as PSNR). However, since an increase in the number of second partition layers PL21~PL2n or in the filter sizes causes an increase in the amount of computation performed at the multilayer ML, adjustments can be made so that the amount of computation required of the multilayer ML is smaller than the amount of computation of a single shuffling layer. In other words, the number of second partition layers PL21~PL2n and the filter sizes can be configured such that the total number of computations performed by the multiple partition layers PL1, PL21~PL2n is smaller than a threshold number, which may be defined beforehand based on the number of computations performed at the shuffling layer illustrated in FIG. 3.

Figure 6A:
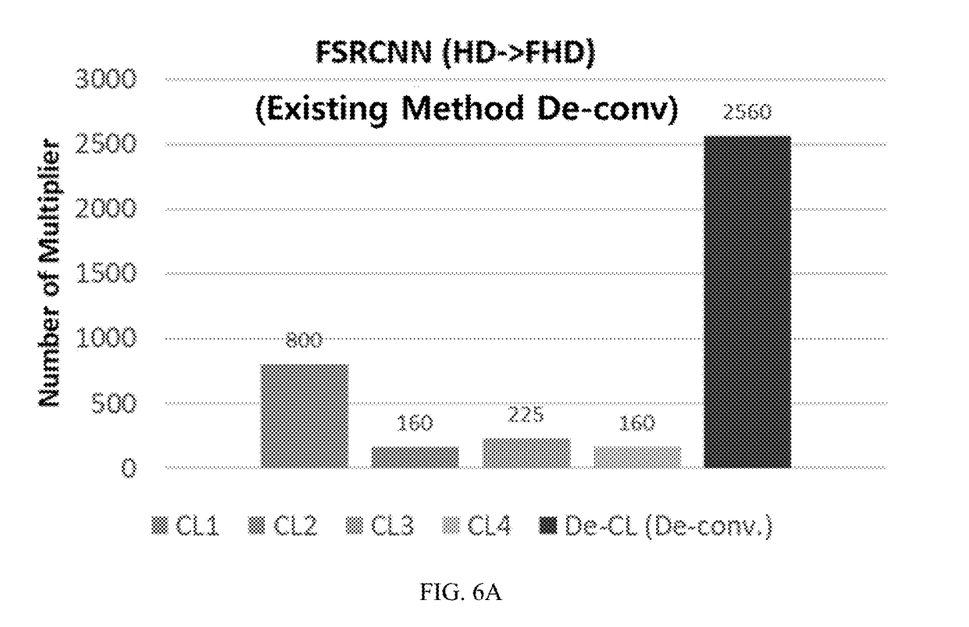
FIG. 6A, FIG. 6B, FIG. 6C, and FIG. 6D are graphs illustrating comparisons that show how the amount of computation may be reduced in an image upscaling apparatus having multiple deconvolution layers according to an embodiment of the disclosure.
Figure 6B:
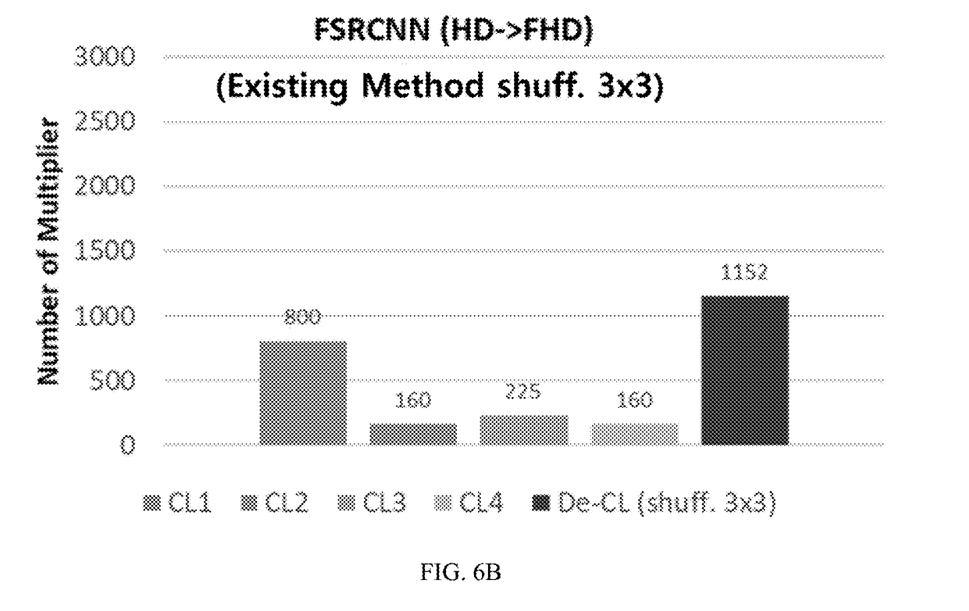
Figure 6C:
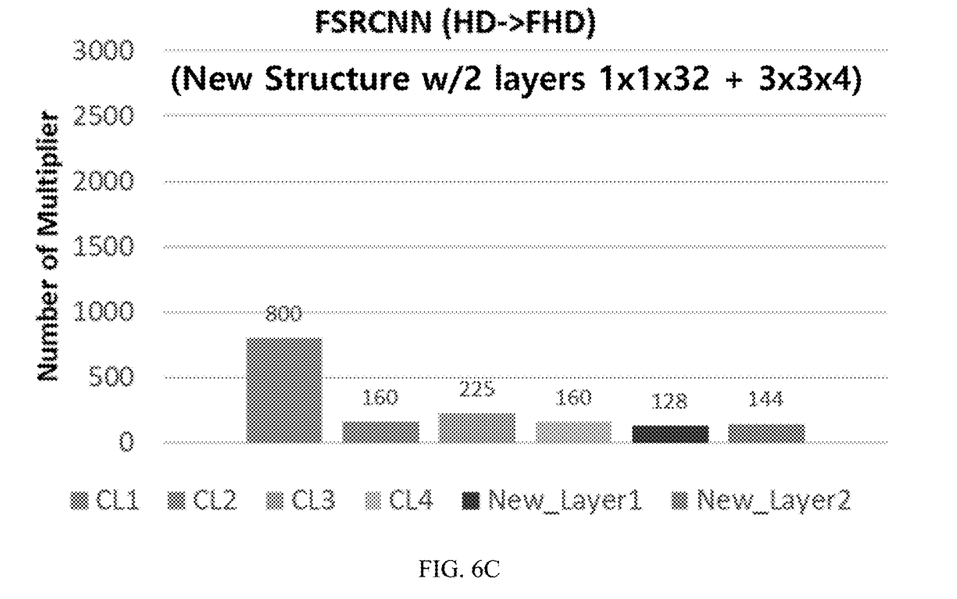
Figure 6D:
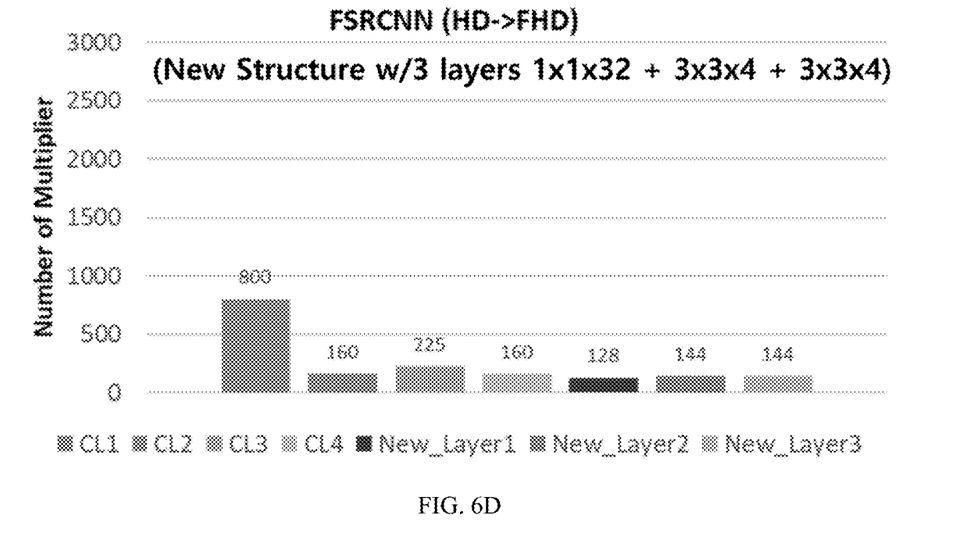

PL2 having a filter size of 3×3×4, while FIG. 6D illustrates a case in which the multilayer ML has three partition layers PL1, PL21, PL22 with the second and third partition layers PL21, PL22 having filter sizes of 3×3×4 and 3×3×4, respectively.

Table 4 compares the sizes and numbers of filters, the amounts of computation, and the PSNR for the cases having a single deconvolution layer DL and a single shuffling layer illustrated in FIG. 6 and the multilayer ML of FIG. 4.

TABLE 4

|   |   |   | F_size | F-Depth | # of F | # of mul | | # of add | | PSNR |
|---|---|---|---|---|---|---|---|---|---|---|
| 1 | | De-Conv. | 9 × 9 | 32 | 1 | 2592 | | 2560 | | 36.51 |
| LAY | | 3 × 3 × 4 + suf(2×) | 3 × 3 | 32 | 4 | 1152 | | 1120 | | 36.50 |
| 2 | | 1 × 1 × 4 + ReLU | 1 × 1 | 32 | 4 | 128 | 272 | 96 | 236 | 36.25 |
| LAYER | | 3 × 3 × 4 + suf(2×) | 3 × 3 | 4 | 4 | 144 | | 140 | | |
| | | 1 × 1 × 4 + ReLU | 1 × 1 | 32 | 4 | 128 | 528 | 96 | 492 | 36.30 |
| | | 5 × 5 × 4 + suf(2×) | 5 × 5 | 4 | 4 | 400 | | 396 | | |
| 3 | | 1 × 1 × 4 + ReLU | 1 × 1 | 32 | 4 | 128 | 416 | 96 | 376 | 36.36 |
| LAYER | | 3 × 3 × 4 + ReLU | 3 × 3 | 4 | 4 | 144 | | 140 | | |
| | | 3 × 3 × 4 + suf(2×) | 3 × 3 | 4 | 4 | 144 | | 140 | | |

TABLE 3

| ML | PL1 | PL21 | PL22 |
|---|---|---|---|
| Filter Size | 1 × 1 | @ × @ | # × # |
| Filter Depth | 32 | 4 | 4 |
| # of Filter | 4 | 4 | 4 |
| # of Mul. | 128 | @ × @ × 4 × 4 | # × # × 4 × 4 |
| # of Add. | 96 | (@ × @ × 4 − 1) × 4 | (# × # × 4 − 1) × 4 |

Table 3 shows the number of multiplication and addition computations performed in the partition layers PL1, PL21, PL22 included in the multilayer ML according to filter size.

As described above, the filter size of the first partition layer PL1 in the multilayer ML can be set to 1×1×32 in accordance with the depth of the final feature map FMap4, i.e. the number of filters of the last convolution layer CL4, while the filter sizes of the two second partition layers PL21, PL22 can be selected from any of a variety of sizes, such as @×@×32 and #×#×32, that are greater than 1×1×32, the size of the filter of the first partition layer PL1.

In this case, the first partition layer PL1 would perform a multiplication operation 128 times and an addition operation 96 times, while the partition layer PL21 would perform a multiplication operation @×@×4×4 times and an addition operation (@×@×4−1)×4 times, and the partition layer PL22 would perform a multiplication operation #×#×4×4 times and an addition operation (#×#×4−1)×4 times.

FIGS. 6A to 6D are graphs illustrating comparisons that show how the amount of computations may be reduced in an image upscaling apparatus having multiple deconvolution layers according to an embodiment of the disclosure.

FIGS. 6A to 6D are provided for an example in which a HD image is upscaled to an FHD image based on the FSRCNN_s, where FIG. 6A shows the results for a case in which the deconvolution layer is used as is, in a manner similar to the case of FIG. 2, FIG. 6B shows the results for a case in which the deconvolution layer is replaced by a shuffling layer, in a manner similar to the case of FIG. 3, and FIG. 6C and FIG. 6D show the results for cases in which the deconvolution layer is replaced by a multilayer ML. FIG. 6C illustrates a case in which the multilayer ML has two partition layers PL1, PL21 with the second partition layer Table 4 shows cases in which the multilayer ML has two partition layers PL1, PL2 and a case in which the multilayer ML has three partition layers PL1, PL21, PL22, where the cases with two partition layers PL1, PL2 include one case in which the second partition layer PL2 has a filter size of 3×3×4 and one case in which the second partition layer PL2 has a filter size of 5×5×4.

As shown in Table 4, for the case in which the multilayer ML has two partition layers PL1, PL2 and the filter size of the second partition layer PL2 is 3×3×4, the numbers of multiplication computations performed at the first and second partition layers PL1, PL2 are 128 and 144, respectively, for a total of 272 computations, and the numbers of addition computations are 96 and 140, respectively, for a total of 236 computations. For the case in which the filter size of the second partition layer PL2 is 5×5×4, the numbers of multiplication computations performed at the first and second partition layers PL1, PL2 are 128 and 500, respectively, for a total of 528 computations, and the numbers of addition computations are 96 and 492, respectively, for a total of 492 computations.

It can be seen that these are great reductions in the numbers of both multiplication and addition computations compared to the cases using the single deconvolution layer DL and the single shuffling layer, which require 2,592 and 1,152 multiplication computations, respectively, and 2,560 and 1,120 addition computations, respectively.

Also, for the case in which the multilayer ML has three partition layers PL1, PL21, PL22 and the filter sizes of the second and third partition layers PL21, PL22 are 3×3×4 and 3×3×4, the total numbers of multiplication and addition computations performed at the multilayer ML are 416 and 376, respectively, also showing great reductions in multiplication and addition computations compared to the cases using the single deconvolution layer DL and the single shuffling layer.

As regards the PSNR, the cases in which the multilayer ML has two partition layers PL1, PL2 show PSNR values of 36.25 and 36.30 depending on the filter size of the second partition layer PL2, and the case having three partition layers PL1, PL21, PL22 shows a PSNR value of 36.36, showing results that do not deviate greatly from the values of 36.51 and 36.50 obtained for the cases of applying the single deconvolution layer DL and the single shuffling layer. That is, it can be seen that, when the multilayer ML of FIG. 4 is applied, the amount of computation can be drastically reduced with almost no impact on the picture quality of the upscaled image. Therefore, since the number of calculators can be greatly reduced when implementing the image upscaling apparatus with hardware, it is possible to manufacture such hardware in a small size and with a low cost.

Although the above descriptions are provided using an example in which a multilayer ML is applied to the FSRC-NN_s, other possible applications can have the multilayer ML replace the deconvolution layer in a FSRCNN or replace the deconvolution layer in other image upscaling apparatuses that are implemented based on the CNN. However, in cases where the goal is to implement a high-performance image upscaling apparatus with small-sized low-cost hardware, it can be said that applying the multilayer ML to the FSRCNN_s would currently be the most effective choice.

Furthermore, as illustrated in FIGS. 6C and 6D, when the multilayer ML includes multiple partition layers, the computations are distributed over the multiple partition layers, and the differences in the amounts of computation between the multiple partition layers and the multiple convolution layers CL1~CL4 become smaller compared to the cases including the single deconvolution layer and shuffling layer shown in FIGS. 6A and 6B, making it possible to design an efficient pipeline structure.

Although it is not illustrated in the drawings, the partition layers other than the last partition layer from among the multiple partition layers of the multilayer ML can further include steps for performing filtering according to a predefined activation function such as a ReLU (rectified linear unit), as shown in Table 3.

Figure 7:
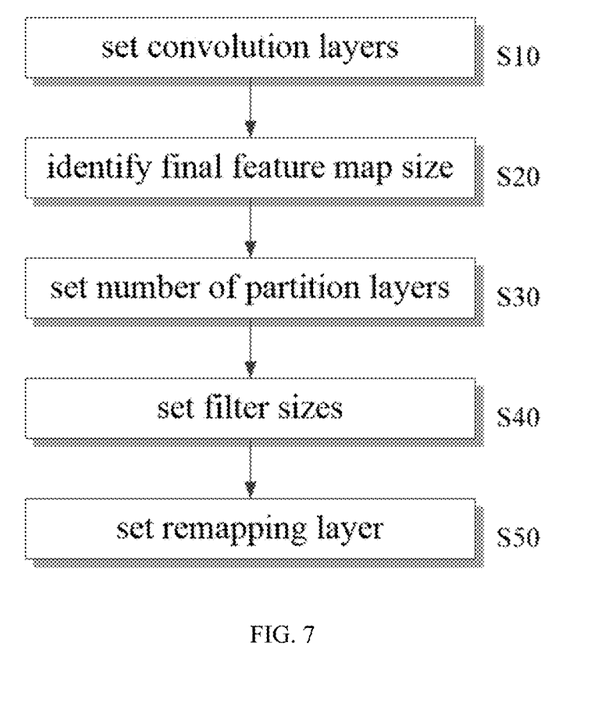
FIG. 7 illustrates a deconvolution layer pluralization method for an image upscaling apparatus according to an embodiment of the disclosure.

FIG. 7 illustrates a deconvolution layer pluralization method for an image upscaling apparatus according to an embodiment of the disclosure.

Describing the deconvolution layer pluralization method for an image upscaling apparatus of FIG. 7 with reference to FIG. 4 and FIG. 5, first, the number of convolution layers to be included and the number and sizes of the filters to be included in each convolution layer may be configured (S10). Here, the number of convolution layers and the number and sizes of the filters included in each convolution layer can be set to a number of convolution layers and a number and size of filters defined beforehand in cases where a FSRCNN or a FSRCNN_s, etc., is applied. However, the numbers and sizes can be adjusted to various values according to the resolution of the input image and the resolution of the output image.

Also, the size of the final feature map outputted from the last convolution layer among the configured multiple convolution layers may be identified (S20). In particular, the depth of the final feature map may be identified. The width and height, i.e. the sizes in the x-axis direction and y-axis direction, in the final feature map can be determined by the resolution of the input image, but the depth of the final feature map may be determined by the number of filters in the final convolution layer. Therefore, the number of filters in the last convolution layer can be identified to determine the depth of the final feature map.

Also, the number of partition layers forming the multilayer ML may be configured (S30). Also, the filter size of each partition layer may be configured (S40). Here, the number of partition layers can be set to two or more, and the size of the filter included in the first partition layer PL1, which is the partition layer receiving the final feature map from among the multiple number of partition layers, can be set to a minimum size while having a depth corresponding to the identified depth of the final feature map. The total number of partition layers included in the multilayer ML can be varied in consideration of the overall amount of computation of the multilayer ML, and similarly, the sizes of the filters included in the partition layers other than the first partition layer PL1 can be selected from a variety of values greater than the size of the filter included in the first partition layer PL1 in consideration of the overall amount of computation of the multilayer ML. That is, the number and filter sizes of the second partition layers PL21~PL2n can be configured such that the number of computations performed in total in the multiple partition layers PL1, PL21~PL2n is smaller than a threshold number determined beforehand based on the number of computations performed at the shuffling layer. Also, the number of filters to be included in each partition layer may be determined according to the difference in resolution between the input image and the output image.

When the number of partition layers that are to form the multilayer ML and the numbers and sizes of the filters that are to be included in the partition layers are determined, then a remapping layer may be configured (S50), which will designate the order in which the multiple elements in the z-axis direction in the shuffle map outputted from the last partition layer of the multiple partition layers are to be expanded and arranged 2-dimensionally. The remapping layer may be configured to determine the arrangement order such that the elements positioned along the z-axis direction of the final shuffle map outputted in a number corresponding to the number of filters included in the partition layers are changed to arrangement positions following a predefined pattern in a 2-dimensional plane. Thus, the remapping layer can obtain an output image having a resolution upscaled compared to the input image from the final shuffle map and output the output image.

A method according to an embodiment of the disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present invention is to be defined by the technical spirit set forth in the appended scope of claims.

What is claimed is:

1. An image upscaling apparatus comprising:
a plurality of convolution layers each configured to receive an input image or a feature map outputted by a previous convolution layer and output a feature map by extracting features from the input image or from the previous feature map; and a multilayer configured to receive a final feature map outputted from a last convolution layer among the plurality of convolution layers and output an output image upscaled to have a predefined resolution higher than a resolution of the input image, wherein the multilayer comprises:

a first partition layer including a plurality of first filters and configured to output a first shuffle map, the first filters having a minimum size along an x-axis and a y-axis direction and having a same size as a z-axis direction size of the final feature map along a z-axis direction, the x-axis, y-axis, and z-axis directions representing width, height, and depth directions of the final feature map; and at least one second partition layer each including a plurality of second filters and configured to shuffle features in the x-axis and y-axis directions of the first shuffle map, the second filters having a size greater than that of the first filter in the x-axis and y-axis directions and having a same size of the first filter in the z-axis direction.

2. The image upscaling apparatus of claim 1, wherein the first partition layer outputs the first shuffle map by having the plurality of first filters perform MAC (multiply-accumulate) operations while moving in units of elements along the x-axis and y-axis directions in the final feature map and arranging computed values obtained as results of the MAC operations at positions corresponding to x-axis and y-axis positions of operand elements but with the computed values arranged at different predefined positions along the z-axis direction in correspondence with the plurality of first filters, respectively.

3. The image upscaling apparatus of claim 2, wherein a number of first filters included in the first partition layer corresponds to a ratio of increase in resolution between the input image and the output image.

4. The image upscaling apparatus of claim 3, wherein each of the at least one second partition layers includes a same number of second filters as a number of the first filters of the first partition layer.

5. The image upscaling apparatus of claim 4, wherein the at least one second partition layer outputs a second shuffle map by having the plurality of second filters perform MAC operations while moving in units of elements along the x-axis and y-axis directions in the first shuffle map or a second shuffle map received from a previous second partition layer and arrange computed values obtained as results of the MAC operations at positions corresponding to x-axis and y-axis positions of operand elements of the received first shuffle map or second shuffle map but with the computed values arranged at different predefined positions along the z-axis direction in correspondence with the plurality of second filters, respectively.

6. The image upscaling apparatus of claim 5, wherein a number of the second partition layers and a size of the second filters are set such that a total number of computations required of the multilayer including the first partition layer and the at least one second partition layer does not exceed a predefined threshold.

7. The image upscaling apparatus of claim 1, wherein each of the plurality of convolution layers comprises at least one convolution filter having a predefined size and having weights obtained by learning mapped therein, the convolution layer configured to receive the input image or a feature map outputted from a previous convolution layer, the convolution filter configured to extract features of the received input image or feature map to output a feature map.

8. The image upscaling apparatus of claim 7, wherein the final feature map has an x-axis direction size and a y-axis direction size corresponding to the resolution of the input image and a z-axis direction size corresponding to a number of convolution filters included in a last convolution layer among the plurality of convolution layers.

9. The image upscaling apparatus of claim 1, wherein the multilayer further comprises a remapping layer configured to expand and rearrange elements arranged in the z-axis direction in a second shuffle map such that the rearranged elements are placed adjacent to each other in a 2-dimensional plane according to a predefined pattern and arrangement order, the second shuffle map outputted from a last second partition layer among the at least one second partition layers.

10. A deconvolution layer pluralization method for an image upscaling apparatus, the deconvolution layer pluralization method comprising:

setting a plurality of convolution layers, the plurality of convolution layers configured to receive an input image or a feature map outputted by a previous convolution layer and output a feature map by extracting features from the input image or from the previous feature map; and setting a multilayer as a deconvolution layer configured to receive a final feature map outputted from a last convolution layer among the plurality of convolution layers and output an output image upscaled to have a predefined resolution higher than a resolution of the input image, wherein the setting of the multilayer comprises:

setting a first partition layer, the first partition layer including a plurality of first filters and configured to output a first shuffle map, the first filters having a minimum size along an x-axis and a y-axis direction and having a same size as a z-axis direction size of the final feature map along a z-axis direction, the x-axis, y-axis, and z-axis directions representing width, height, and depth directions of the final feature map; and setting at least one second partition layer, the at least one second partition layer each including a plurality of second filters and configured to shuffle features in the x-axis and y-axis directions of the first shuffle map, the second filters having a size greater than that of the first filter in the x-axis and y-axis directions and having a number and size of the first filter in the z-axis direction.

11. The deconvolution layer pluralization method of claim 10, wherein the setting of the first partition layer comprises:

setting the plurality of first filters to perform MAC (multiply-accumulate) operations while moving in units of elements along the x-axis and y-axis directions in the final feature map; and configuring the first partition layer to output the first shuffle map by arranging computed values obtained as results of the MAC operations at positions corresponding to x-axis and y-axis positions of operand elements but with the computed values arranged at different predefined positions along the z-axis direction in correspondence with the plurality of first filters, respectively.

12. The deconvolution layer pluralization method of claim 11, wherein the setting of the plurality of first filters comprises setting the number of first filters in correspondence to a ratio of increase in resolution between the input image and the output image.

13. The deconvolution layer pluralization method of claim 12, wherein the setting of the at least one second partition layers comprises setting a number of second filters included in each of the at least one second partition layers to be equal to the number of first filters in the first partition layer.

14. The deconvolution layer pluralization method of claim 13, wherein the setting of the at least one second partition layers comprises:
   setting the plurality of second filters to perform MAC operations while moving in units of elements along the x-axis and y-axis directions in the first shuffle map or a second shuffle map received from a previous second partition layer; and
   configuring the at least one second partition layers to output a second shuffle map by arranging computed values obtained as results of the MAC operations at positions corresponding to x-axis and y-axis positions of operand elements of the received first shuffle map or second shuffle map but with the computed values arranged at different predefined positions along the z-axis direction in correspondence with the plurality of second filters, respectively.

15. The deconvolution layer pluralization method of claim 14, wherein the setting of the at least one second partition layers comprises setting a number of the second partition layers and a size of the second filters such that a total number of computations required of the multilayer including the first partition layer and the at least one second partition layer does not exceed a predefined threshold.

16. The deconvolution layer pluralization method of claim 10, wherein the setting of the plurality of convolution layers comprises:
   setting a number of the convolution layers by receiving the input image or a feature map outputted from a previous convolution layer, and extracting features of the received input image or feature map to output a feature map; and
   setting the number and size of convolution filters to which weights obtained by learning are mapped with a predetermined size for each of the set convolution layers.

17. The deconvolution layer pluralization method of claim 16, wherein the final feature map has an x-axis direction size and a y-axis direction size corresponding to the resolution of the input image and a z-axis direction size corresponding to a number of convolution filters included in a last convolution layer among the plurality of convolution layers.

18. The deconvolution layer pluralization method of claim 10, wherein the setting of the multilayer comprises setting a remapping layer to expand and rearrange elements arranged in the z-axis direction in a second shuffle map such that the rearranged elements are placed adjacent to each other in a 2-dimensional plane according to a predefined pattern and arrangement order, the second shuffle map outputted from a last second partition layer among the at least one second partition layers.

\* \* \* \* \*